(12) United States Patent
Liu

(10) Patent No.: US 11,192,802 B2
(45) Date of Patent: Dec. 7, 2021

(54) DESALINIZATION DEVICE AND METHOD OF USING THE SAME

(71) Applicant: Depei Liu, Guangzhou (CN)

(72) Inventor: Depei Liu, Guangzhou (CN)

(*) Notice: Subject to any disclaimer, the term of this patent is extended or adjusted under 35 U.S.C. 154(b) by 0 days.

(21) Appl. No.: 16/571,099

(22) Filed: Sep. 14, 2019

(65) Prior Publication Data

US 2020/0087167 A1 Mar. 19, 2020

(30) Foreign Application Priority Data

Sep. 20, 2018 (CN) .......................... 201811075633.3

(51) Int. Cl.
*C02F 1/04* (2006.01)
*C02F 1/12* (2006.01)
(Continued)

(52) U.S. Cl.
CPC .............. *C02F 1/043* (2013.01); *B01D 1/065* (2013.01); *B01D 1/20* (2013.01); *B01D 1/305* (2013.01); *B01D 9/0004* (2013.01); *B01D 9/0027* (2013.01); *C02F 1/048* (2013.01); *C02F 1/12* (2013.01); *C02F 1/52* (2013.01); *C02F 9/00* (2013.01); *B01D 19/02* (2013.01); *B01D 2009/0086* (2013.01); *C02F 1/66* (2013.01);
(Continued)

(58) Field of Classification Search
CPC .......... B01D 1/065; B01D 1/20; B01D 1/305; B01D 9/0004; B01D 9/0027; C02F 1/043; C02F 1/048; C02F 1/12; C02F 1/52; C02F 9/00; C02F 2001/5218; C02F 2101/10; C02F 2101/322; C02F 2103/343; C02F 2103/36
See application file for complete search history.

(56) References Cited

U.S. PATENT DOCUMENTS 3,930,960 A * 1/1976 Taylor ...................... B01D 1/10
202/185.6
4,217,176 A * 8/1980 Antony ................ B01D 1/2856
202/173

(Continued)

FOREIGN PATENT DOCUMENTS

| CN | 101566424 B | 1/2011 |
| CN | 207726912 U | 12/2017 |
| JP | 2018-175319 A | 7/2017 |

*Primary Examiner* — Jonathan Miller
(74) *Attorney, Agent, or Firm* — GFD Patents, LLC; Gerald F. Dudding

(57) ABSTRACT

The invention is a high-salt waste water air powered low temperature evaporating device and method of use. A tray is mounted on a lifting platform; an air inlet and a water inlet are on the tray. Air distributing pipes are arranged at the center of the nested column tubes (33). A groove (4) is installed at the top of the tray, and mounting points are accompanied by multiple nested column tubes (33). The nested column tubes (33) are connected with the air inlet. An atomizer is arranged inside the air distributing pipes; and the atomizer is connected with the water distributing pipes. Using air power evaporates concentrated waste water multiple times so that the salt in the wastewater reaches saturated concentration, and therefore, the wastewater temperature is reduced, salt is crystallized and separated out, liquid is continuously evaporated, and the wastewater can be completely treated.

10 Claims, 3 Drawing Sheets

(51) Int. Cl.
*C02F 1/52* (2006.01)
*C02F 9/00* (2006.01)
*B01D 1/06* (2006.01)
*B01D 1/20* (2006.01)
*B01D 1/30* (2006.01)
*B01D 9/00* (2006.01)
B01D 19/02 (2006.01)
C02F 1/66 (2006.01)
C02F 101/10 (2006.01)
C02F 101/32 (2006.01)
C02F 103/34 (2006.01)
C02F 103/36 (2006.01)

(52) U.S. Cl.
CPC .. *C02F 2001/5218* (2013.01); *C02F 2101/10* (2013.01); *C02F 2101/322* (2013.01); *C02F 2103/343* (2013.01); *C02F 2103/36* (2013.01)

(56) References Cited

U.S. PATENT DOCUMENTS

| | | | | |
|---|---|---|---|---|
| 5,783,047 | A * | 7/1998 | Aso | B01D 1/28 202/154 |
| 5,814,192 | A * | 9/1998 | Pittmon | B01D 1/28 159/28.6 |
| 5,853,549 | A * | 12/1998 | Sephton | C02F 1/16 203/2 |
| 6,309,513 | B1 * | 10/2001 | Sephton | F28D 7/163 202/155 |
| 8,986,508 | B2 | 3/2015 | Ophir et al. | |
| 9,772,141 | B2 * | 9/2017 | Kaminski | B01D 5/006 |
| 10,143,934 | B2 * | 12/2018 | van Gils | B01D 1/06 |

\* cited by examiner

DESALINIZATION DEVICE AND METHOD OF USING THE SAME

FIELD OF THE INVENTION

The present invention relates generally to devices and methods used to separate water from salt water. More specifically, the present invention relates to a air powered, low temperature evaporation device for high salt waste water and an air powered, low temperature evaporation method for high salt waste water.

BACKGROUND

During dye, pharmaceutical, pesticide and other fine chemical production processes, desalinization of waste water from the processes may be extremely difficult because of the presence of high salt and organic compounds in the waste water.

Therefore there is a need for improved devices and methods of desalinization of waste water from fine chemical production processes.

SUMMARY OF THE INVENTION

A first aspect of the present invention provides a high-salt wastewater air powered low-temperature evaporation device. The invention is comprised of a steel structure frame, a lifting platform and a tray, a nested tube column, nested column tubes, a plurality of atomizer(s), a plurality of air distribution pipe(s), a plurality of water distribution pipe(s), a water inlet, an air inlet, a gas collecting cover, an air exhaust outlet, a concentrated liquid waste collecting groove, and a demister. The demister is provided inside the cover. There is also a concentrated liquid outlet, a crystallization tank, a blower, and a hot air blower. The nested tube column is installed inside the steel structure frame, the tray is mounted on the lifting platform; and the air inlet is provided above an air distributing pipe and a water distributing pipe. The air inlet is respectively connected with the air blower and the hot air fan. A concentrated liquid waste collecting groove disposed above the air inlet, and a concentrated liquid outlet is opened on the side wall of the concentrated waste water groove. A plurality of mounting holes is defined in the bottom of the concentrated liquid waste collecting groove, and the mounting holes are provided with a plurality of air distributing pipes. The air distributing pipes are connected to the air inlets, and the top of the air distributing pipe is provided with atomization. The atomizer is in communication with the water distributing pipe, the nested tube column is vertically installed outside the air distributing pipe, and the nested column tubes are not in contact with the air distributing pipe. The nested tube column extends to the top of the steel structure frame, wherein a gas collecting cover is fixed at the top of the frame. The gas collecting cover is in communication with the nested tube column, and the gas collecting cover is provided with an exhaust port.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE EMBODIMENTS OF THE INVENTION

Definitions

As used herein, unless otherwise defined, the term "mechanical vapor recompression (MVR)" refers generally to industrial processes such as evaporation and distillation, wherein heat from the condenser, which would otherwise be lost, can be recovered and re-used in the evaporation and distillation processes.

As used herein, unless otherwise defined, the term "multi-effect evaporator" refers to boiling water in a sequence of vessels, each held at a lower pressure than the last. Because the boiling temperature of water decreases as pressure decreases, the vapor boiled off in one vessel can be used to heat the next, and only the first vessel (at the highest pressure) requires an external source of heat.

As used herein, unless otherwise defined the term "despumating" is defined as the process of removing scum.

During Dye, pharmaceutical, pesticide and other fine chemical production process, the salt content in the waste water is generally greater than 10 g/L, and Chemical Oxygen Demand (COD) is higher than 2 g/L. In the industry of such waste water will be collectively referred to as high salt high organic waste water, which is extremely difficult to treat due to the difference between production processes. The organic matter in the waste water has various types and chemical properties. It is composed of heterocyclic compound and the benzene series. Thus the biotransformation can hardly happen. At the same time, waste water containing salt substances such as $Cl^-$, $SO_4^{2-}$, $Na^+$, and $Ca^{2+}$ are found at high concentrations. Although these ions are essential for the growth of the microbe, the inorganic salt concentration is too high which inhibits and poisons the microorganism, thus waste water cannot be treated using biological degradation treatment method. At present, the commonly used desalting method is the physical method of evaporation. The main evaporating device has multi-effect evaporation and MVR. Because high salt waste water has mixed salt, having high concentration and various substances, multi-effect evaporation and MVR evaporation device needs to crystallize the salt-containing waste water step-by-step. High salt waste water is very corrosive at the boiling point during evaporation. Therefore, the evaporation chamber must be made with the metal titanium, causing the fabrication cost to be expensive. At the same time, the process requires a high-speed compressor, which has a high price, and the failure rate is very high as well. In addition the high salt waste water has high concentration of salt as well as organic matter, during evaporation process, coking is often occurs, thus multi-effect evaporation and MVR device cannot be continuously and stably operated.

The purpose of this invention is to provide a high-salt waste water air powered low temperature evaporation device 20, operating at ambient temperature or slightly higher than the ambient temperature.

Figure 1:
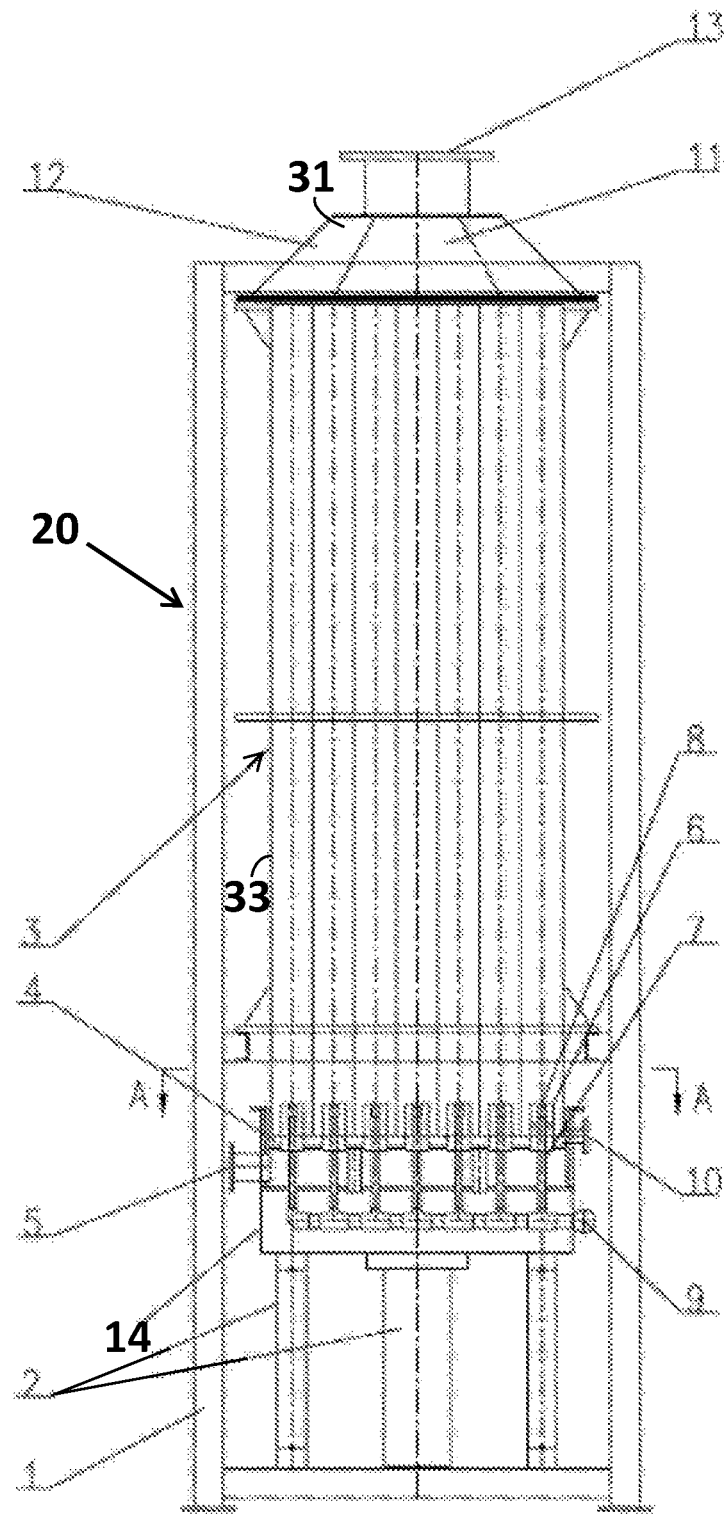
FIG. 1 depicts a perspective view of the desalinization device 20, in accordance with embodiments of the present invention.

FIG. 1 depicts a perspective view of the high-salt waste water air powered low temperature evaporation device 20. The device 20 is mainly composed of non-metallic materials, having the benefits of low cost and high construction efficiency. Using natural air, air power, and thermal energy, concentrating waste water greatly saves energy costs. At the same time, due to the low temperature evaporation, the concentration of pollutants in the waste gases exhausted is very low, which makes the exhaust gas purification treatment more convenient.

In order to achieve the purpose of this invention, the invention provides a high-salt waste water air powered low temperature evaporation device 20, including 1, a steel structure frame; a lifting platform 2 and a tray 14; 3, a nested tube column; 8, an atomizer; 7, a water distributing pipe; 6, an air distributing pipe, 9, a water inlet; 5, an air inlet; 31, an air collection tank; 13, a gas exhaust outlet: 4, a concentrated liquid waste collecting groove; 11, demister(s); 10, a concentrated solution outlet; and 30, a crystallization tank.

The nested tube column 3 is installed inside the steel structure frame 1, the tray 14 is mounted on the lifting platform 2; air distributor and water distributor are arranged above the air inlets, and the air inlets are respectively communicated with the blower and the hot air heater; the a concentrated liquid waste collecting groove 4 is placed above the air inlet and have concentrated solution outlets on the side walls, the bottom of the a concentrated liquid waste collecting groove 4 on the tray is provided with a plurality of mounting holes, the mounting holes are arranged with multiple air distributors, and the air distributors are connected with the air inlet. The top of the air distributing pipe is provided with an atomizer, the atomizer is connected with a water pipe; the nested column tubes 33 are vertically arranged at the outside of the air distributors, having no direct contact with the air distributors; the nested column tubes 33 extend to the top of the steel structure frame; a gas collection tank 31 is fixed on the top of the steel structure frame, connecting with the nested column tube 3 and installed with exhaust outlets. Ultimately, demisters 11 are installed inside of the gas collection tank 31.

In one embodiment, the high salt waste water air powered low temperature evaporation device 20 advantageously includes a plurality of water collection pools. The water collection pools are respectively connected with the water inlet, crystallization tank 30 and concentrated liquid outlet 10.

In one embodiment, insulation brick is on the long axis direction of the air distributing pipes' center line.

In one embodiment, the atomizer is advantageously arranged on the center line of the air distributing pipe 6, and is placed inside the end of the pipe.

In one embodiment, the air distributing pipe is advantageously connected with the heat exchanger 22 and air powered hot water device.

In one embodiment, the working surfaces of the high salt waste water air powered low temperature evaporation device 20 are made of plastic material or coated with plastic material.

The method 25 provides an air powered, low temperature evaporation treatment method for high salt, high organic waste water.

Example 1

In order to achieve the purpose of the invention, the invention provides an air powered low temperature evaporation treatment method 25 for high salt, high organic waste water, comprising the following steps:

S1: The waste water is pretreated to remove low molecular volatility organic material, and adjusting the pH value of the waste water;

S2: After the treatment of the waste water by precipitation, determined by water quality, the water is transported into different water tanks;

S3: The waste water is pumped into the high-salt, high organic waste water air powered low temperature evaporation device 20, and then vertically injected by the atomizer 8, forming micro droplets in the evaporation chamber water distributing pipes 7, at the same time the blower blast air into the air inlet. Air passes through the air distributing pipes 6 and enters in to the nested column tubes 33.

S4: micro droplets become water vapor after being blown by the air, and enter the air collection tank 31. Part of the remaining micro droplets slip down along the pipes while forming a liquid film, forming convection with the upward hot air, which continues to absorb heat and evaporate;

S5: the remaining waste water flows into the concentrated water collection tank assembly 35. After a certain amount of concentrated waste water is collected, the collected concentrated water will be transported into water collection tank 35 for further treatment. Gas exhaust leaves from the gas exhaust outlet 13 after despumating by the demister 11;

S6: the waste water collected in the previous step once again is inserted into the low temperature evaporation device, vertically injected by the atomizer, forming micro droplets in the evaporation chamber distributing pipes, at the same time, the hot air blower blasts hot air which was produced by the air powered air heater into the air inlet. Hot air enters the pipes through air distributing pipes.

S7: repeat S4 and S5;

S8: The waste water collected once again is inserted into the low temperature evaporation device, vertically injected by the atomizer, forming micro droplets, in the evaporation chamber distributing pipes. At the same time, the hot air blower blasts hot air into the air inlet. In addition, hot water is added into the heat exchanging pipe. Air then enters the pipes through air distributing pipes.

S9: after repeating S4, the remaining micro droplets slip into a concentrated liquid waste collecting groove 4 through the pipe wall. After collecting a certain amount of concentrated waste water, the waste water is transported into the crystallization tank 30 through the concentrated liquid outlet; and S10: Cooling the concentrated waste water inside the crystallizing groove, the salt crystallizes. Removing the resulting crystals from the mixture, the remaining waste water in the pool is transported to the water collection tank 35 and wait for the follow-up treatment.

In one embodiment, the preprocessing of the step S1 comprises treatment and adjustment to the waste water quality, the water amount, and the water temperature.

In one embodiment, after adjusting by step S1, the waste water has a pH in the range of 5-9.

In one embodiment, the salt content of the water collection tank 35 in the step S5 is in the range of 1%-10%; the salt content of the water collection tank 35 in the step S7 is in the range of 5%-20%; the salt content of the water collection tank 35 in the step S9 is in the range of 15%-35%.

In one embodiment, in the steps S3, S6 and S8 the rise of air flow rate is adjusted according to the water quality and the temperature. The control range is 0.8 meters/second to 2.5 meters/second.

The invention provides a high salt waste water air powered low temperature evaporation device 20 and high salt waste water air powered low temperature evaporation treatment method 25, having the following advantages:

1. In this high salt waste water low temperature evaporation device, evaporation and separation processes happen in the same space, therefore the structure is simple. This design also avoids the traditional heating interface, as well as the equipment which is dedicated for the vapor-liquid separation, thus greatly improves the efficiency of processing.

2. When the environmental temperature is high, and air humidity is relatively low, the high salt waste water low temperature evaporation device can directly blast the air, utilizing the thermal energy of air as energy used for evaporation, without using steam or electric heating, thus having a low cost and low energy consumption.

3. The invention is provided with an atomizer, which can vertically spray the high salt waste water into the chamber through the atomizer, forming micro droplets and mist. The droplets are fully contact with air due to the lifting of the air, evaporating and bringing out the water, achieving a high concentration with high efficiency.

4. In the high salt waste water air powered low-temperature evaporation method, the air has direct contact with the waste water to exchange the heat, therefore the heat loss in the system is less, and the heat exchange efficiency is higher.

5. In the high salt waste water air powered low temperature evaporation method, evaporation occurred in low temperature. There is no heat exchange interface, therefore no fouling and coking phenomenon would appear, and the machinery does not need to undergo periodic cleaning, greatly increases the device's functional operation time. This saves considerable maintenance and equipment replacement costs.

6. The invention of high salt waste water air powered low temperature evaporation process is simple and operated stably, having low energy consumption, and is safe and reliable.

Mode of Execution

Combining the figures of the embodiment of the invention, a clear, and complete description of the technical solution of the invention is provided below. Obviously, the embodiment described is only a portion of the embodiment of this invention, not all of the embodiments. The above is only a preferred embodiment of the present invention, and it should be noted that those skilled in the art can make several improvements and substitutions without departing from the technical principles of the present invention. It should also be considered as the scope of protection of the present invention.

FIG. 1 depicts a cross-sectional view of a desalinization device 20, e.g. a high-salt waste water air powered low temperature evaporation device. The device 20 comprises: 1, a steel structure frame; a lifting platform 2 and tray 14; 3, a nested tube column; 4, a concentrated liquid waste collecting groove; 5, an air inlet; 6, air distributing nested column tubes 33; 7, water distributing nested column tubes 33; 8, an atomizer; 9, a water inlet; 10, concentrated solution outlet; 11, a demister; 12, a gas collecting cover; 13, a gas exhaust outlet; and 22, a heat exchanger. The tray 14 is mounted on the lifting platform 2; the air inlet and the water inlet are on the tray 14; the water distributing tube is arranged at the center of the air distributing tube; the atomizer is arranged at the top of the nested column tubes 33; a concentrated liquid waste collecting groove 4 is installed at the top of the tray, and the mounting points are accompanied by multiple nested column tubes 33. The nested column tubes 33 are connected with the air inlet. The atomizer is arranged inside the air distributing tube; and the atomizer is connected with the nested column tubes 33. Using air power evaporates concentrated waste water multiple times so that the salt in the wastewater reaches saturated concentration, and therefore, the wastewater temperature is reduced, salt is crystallized and separated out, liquid is continuously evaporated, and the wastewater can be completely treated. The demister 11 may be a de-foaming device.

The lifting platform 2 and the tray 14 are installed inside the steel structure frame 1. The lifting platform 2 and the tray 14 are mounted with an air inlet 5, and the top surface of the air inlet 5 is provided with an air distributing pipe 6 and a water distributing pipe 7. In all embodiments of the present invention the air distributing pipe 6 may be made with cloth. The air inlets 5 are respectively connected to the air blower and the heat blower; the concentrated liquid waste collecting groove 4 is installed above the air inlet 5, and the concentrated waste liquid outlet 10 is opened on the side wall of the concentrated liquid waste collecting groove 4 and the concentrated liquid is collected. A plurality of mounting holes are defined in the bottom wall of the groove 4, and the mounting holes are provided with a plurality of air ducts 6 communicating with the air inlets 5, wherein the air ducts 6 are provided with fog. The atomizer 8 is in communication with the water distributing pipe 7; nested tube column 3 is vertically installed outside the air distributing pipe 6, the nested tube column 3 is not in contact with the air distributing pipe 6, and the nested tube column 3 is extended to a top end of the steel structure frame 1; a gas collecting cover 12 is fixed to the top end of the steel structure frame 1, the gas collecting cover 12 is in communication with the nested tube column 3, and the gas collecting cover 12 is provided with an exhaust port 13 for collecting gas. A demister 11 is disposed inside the cover 12.

Preferably, high salt waste water air powered low temperature evaporation device 20 also includes a water reservoir and the crystallization tank, the water collection pool is respectively connected with the water inlet 9, crystallization tank and concentrated solution outlet 10.

There can be one or more pools, corresponding to one or more steps, or covering multiple entrances and exits. Preferably, the nested tube column 3 coincides with the center line of the air distributing pipe 6 along the long axis direction.

Specifically, the air distributing pipe 6 and water distributing pipe 7 coincides with the central line of the device, so that the air blasts are evenly distributed.

Preferably, the atomizer 8 is disposed on the center line of the air distributing pipe 6 and is located inside the air distributing pipe 6, and the top end of the atomizer 8 does not protrude outside the air distributing pipe 6.

Specifically, the atomizer 8 is disposed on the center line of the air distributing pipe 6 to ensure uniformity of the droplets ejected by the atomizer 8 dispersed in the air to ensure that each micro-droplet reaches a fluidized state, and as much as possible to increase the contact time of the micro-droplet with the air.

Figure 2:
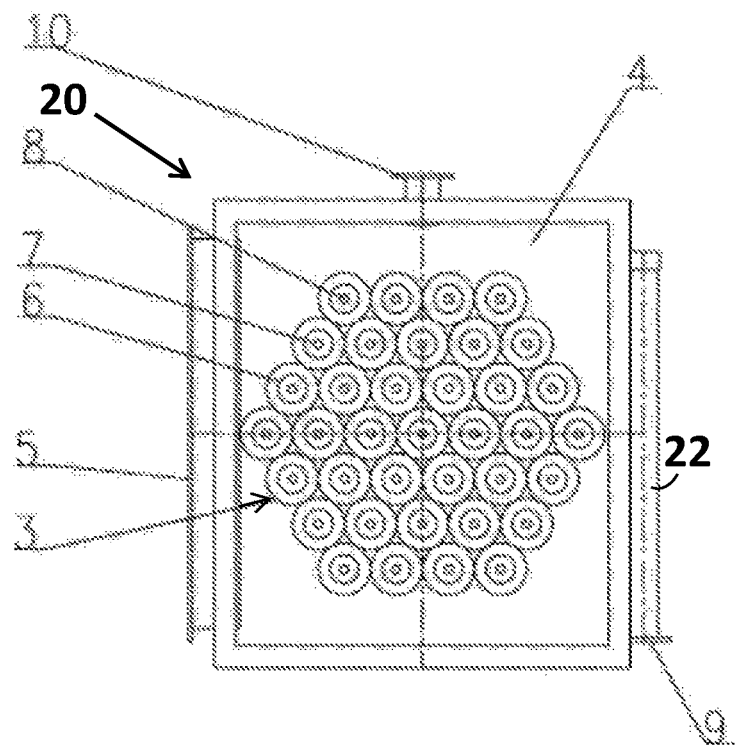
FIG. 2 depicts a cross-sectional view of the desalinization device 20 taken along the line A-A of FIG. 1, in accordance with embodiments of the present invention.

FIG. 2 depicts a cross-sectional view of the desalinization device 20 taken along the line A-A of FIG. 1. Preferably, the atomizer 8 is connected to the water distributing pipe 7, and the water distributing pipe 7 connects with the water inlet 9, and the water inlet 9 is connected to the heat exchanger 22 to communicate with the air powered water heater device.

In particular, when the external air humidity is high and the temperature is low, when the hot air is blown into the evaporation device by the hot air fan, the efficiency of the device still cannot be ensured. The hot water can be added to the evaporation device to ensure the normal operation of the device, and the hot water temperature can also be adjusted, to speed up the processing efficiency of the device.

Preferably, the atomizer 8 is disposed on the center line of the air distributing pipe 6 and is located inside the air distributing pipe 6, and the top end of the preferred atomizer 8 does not protrude outside the air distributing pipe 6. Preferably, the high-salt waste water air powered low-temperature evaporation device body is made of a plastic material. Specifically, the high-salt wastewater high-temperature evaporation device 20 of the present invention operates at a low temperature throughout the whole process, and the overall temperature is not high. Therefore, the main body of the device is preferably made of a plastic material, which can meet the requirements, having low cost and is simple to manufacture.

Figure 3:
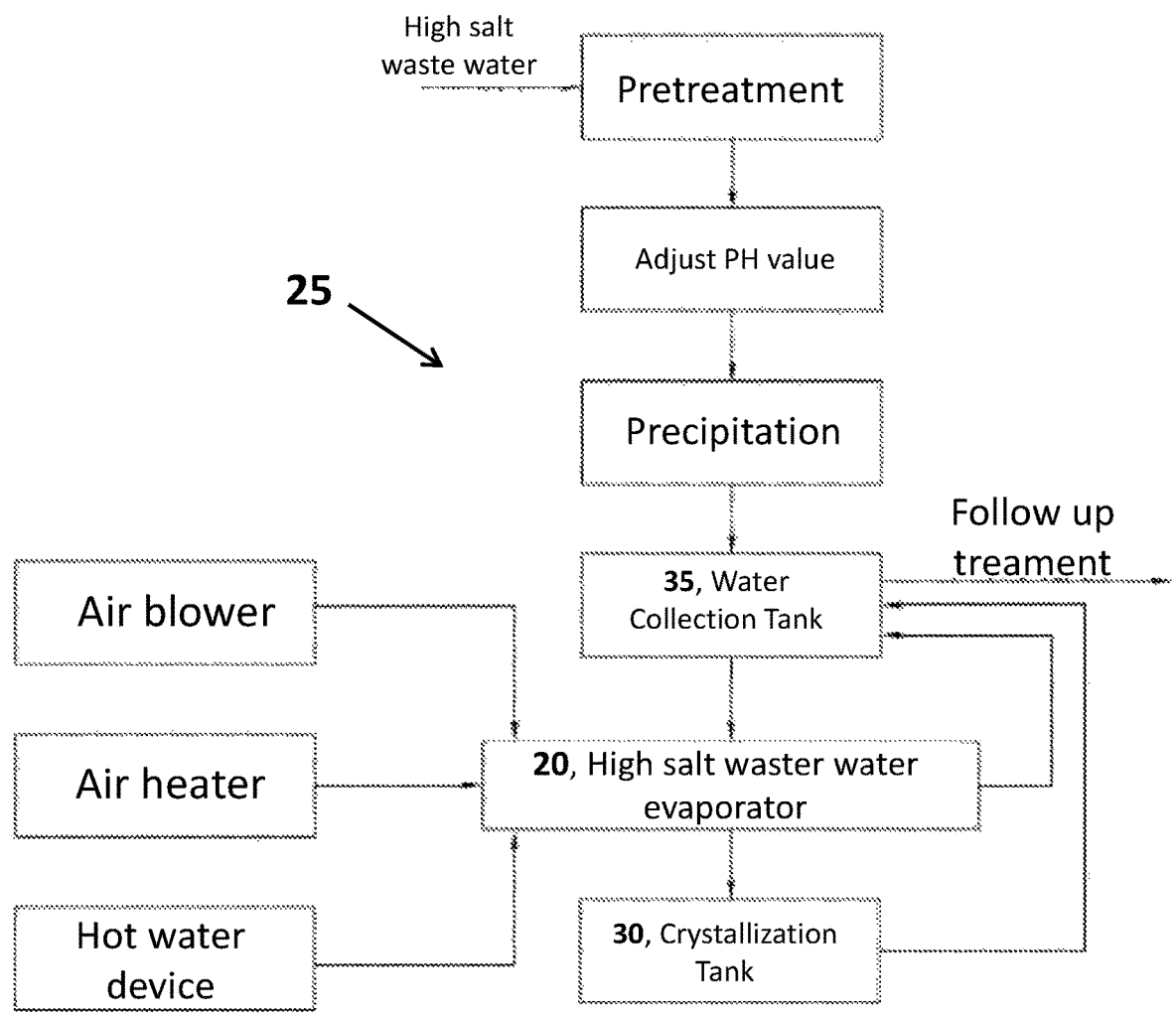
FIG. 3 depicts a flow diagram of a method 25 of desalinization, in accordance with embodiments of the present invention.

FIG. 3 depicts a flow diagram of the method 25, e.g., a high-salt waste water air powered low temperature evaporation method, comprising the following steps:

S1: Waste water is pretreated to remove low molecular volatility organic material, and adjusting the pH value of the waste water;

S2: After the treatment of the waste water by precipitation, determined by water quality, the water is transported into different water tanks;

S3: the waste water is pumped into the air powered low temperature evaporation device, and then vertically injected by the atomizer, forming micro droplets into the evaporation chamber distributing pipes. At the same time the blower blasts air into the air inlet 5 air, which passes through the water distributing pipes 7 and enters into the nested column tubes 33. The air powered low-temperature evaporation device is the aforesaid high-salt, high organic waste water air powered low temperature evaporation device 20;

S4: micro droplets become water vapor after being blown by the air and enter the air collection tank 31. Part of the remaining micro droplets slip down along the pipes while forming a liquid film, forming convection with the upward hot air, keep absorbing heat and continuing evaporation;

S5: the remaining waste water flows into the concentrated water collection tank assembly. After a certain amount of concentrated waste water is collected, the collected concentrated water will be transported into water collection tank 35 and stands ready for the next step in the process 25, e.g., leaving from the gas exhaust outlet 13 after despumating by the mist eliminator 11.

S6: the waste water collected in the previous step once again are processed through the low temperature evaporation device, vertically injected by the atomizer, forming micro droplets, into the evaporation chamber distributing pipes At the same time, the hot air blower blast hot air which was produced by the air powered air heater into the air inlet. Hot air enters the pipes through air distributing pipes;

S7: repeat S4 and S5;

S8: the waste water collected once again is run through the low temperature evaporation device, vertically injected by the atomizer, forming micro droplets, into the evaporation chamber distributing pipes. At the same time, the hot air blower blast hot air into the air inlet. Hot water is added into the heat exchanging pipe. Air enters the pipes through air distributing pipes;

S9: after repeating S4, the remaining micro droplets slip into the concentrated water collection tank 35 through the pipe wall. After collecting a certain amount of concentrated waste water, the waste water is transported into the crystallization tank 30 through the concentrated liquid outlet 10; and S10: cooling the concentrated waste water inside the crystallizing tank 30, the salt crystallizes. Removing crystals from the mixture, the remaining waste water in the pool is transported to the collection tank and wait for the follow-up treatment.

In one embodiment, the preprocessing of the step S1 advantageously comprises treatment and adjustment to the waste water quality, the water amount, and the water temperature.

In one embodiment, after adjusting by step S1, the waste water advantageously has the pH in the range of 5-9.

In one embodiment, the salt content of the water collection tank 35 in the step S5 is advantageously in the range of 1%-10%; the salt content of the water collection tank 35 in the step S7 is advantageously in the range of 5%-20%; and the salt content of the water collection tank 35 in the step S9 is advantageously in the range of 15%-35%.

In one embodiment, in the step S3, S6 and S8 the rise of air flow rate is advantageously adjusted according to the water quality and the temperature. The control range is 0.8 meters/second to 2.5 meters/second.

Preferably, the present invention high salt waste water air powered low-temperature evaporation device, can select from a plurality of installation modes, as follows:

A: Single mode. The step of S3~S10 is carried out by a single high-salt wastewater air powered low-temperature evaporation device. In the case of processing a small amount of high-salt sewage where the processing efficiency is not high, this mode can be selected to save cost;

B: Three series modes. By setting three high-salt wastewater air powered low-temperature evaporation devices, the first corresponds to steps S3 to S5, the second corresponds to steps S6 to S7, and the third corresponds to S8 to S9, wherein the wastewater of S5 and S7 does not need to be re-passed into the collecting groove, and the concentrated liquid waste collecting groove 4 does not have to wait for the collection of the wastewater, but directly opens the concentrated liquid outlet 10, and passes the water chestnut into the next high-salt low-temperature evaporation device.

C: The three-group series mode, ideally selected when dealing with a large amount of high-salt wastewater which requires high treatment efficiency. By setting three sets of high-salt wastewater air-energy low-temperature evaporation devices, the first group corresponds to steps S3 to S5, the second group corresponds to steps S6 to S7, and the third group corresponds to S8 to S9, wherein the wastewater of S5 and S7 does not need to be re-introduced. Therefore, the concentrated liquid waste collecting groove 4 does not have to wait for the collection of the wastewater, but directly opens the concentrated liquid outlet 10, and passes the wastewater into the next group of high-salt wastewater air-low temperature evaporation devices. Each group selects multiple units of the same operating condition to operate in parallel according to actual needs.

The invention provides a high salt waste water air powered low temperature evaporation device and high salt waste water air powered low temperature evaporation treatment method, having the following advantages.

1. In this high salt waste water low temperature evaporation device, evaporation and separation processes happen in the same space, therefore the structure is simple. This design also avoids the traditional heating interface, as well as the equipment which is dedicated for the vapor-liquid separation, thus greatly improves the efficiency of processing.

2. When the environment temperature is high, and air humidity is relatively low, the high salt waste water low temperature evaporation device can directly blast air, utilizing the thermal energy of the air as energy used for evaporation, without using steam or electric heating, thus providing a low cost and low energy consumption.

3. The invention is provided with an atomizer, which can vertically spray the high salt waste water into the chamber through the atomizer, forming micro droplets and mist. The droplets are fully in contact with the air due to the lifting of the air, evaporating and bringing out the water, achieving higher efficiency in achieving higher concentrations.

4. In the high salt waste water air powered low-temperature evaporation method, the air has direct contact with the waste water to exchange the heat, therefore the heat loss is less, and the heat exchange efficiency is higher.

5. In the high salt waste water air powered low temperature evaporation method, evaporation occurs in a low temperature. There is no heat exchange interface, therefore no fouling and coking phenomenon would appear, and the machinery does not need to do periodical cleaning, greatly increases the device's functional operation time. This saves on the maintenance and equipment replacement cost.

6. The invention of high salt waste water air powered low temperature evaporation process is simple and operated stably, having low energy consumption, and is safe and reliable.

The above is only a preferred embodiment of the present invention, and it should be noted that those skilled in the art can make several improvements and substitutions without departing from the technical principles of the present invention. It should also be considered as the scope of protection of the present invention.

While exemplary embodiments have been specifically disclosed, it should be understood that the practice of this invention is not limited to those embodiments. Modifications and variations falling within the spirit of the invention will occur to those skilled in the art. Therefore, it is not intended that the scope of the invention be determined by the disclosed exemplary embodiments, but rather should be determined by the breadth of the appended claims.

I claim:

1. A high-salt wastewater air powered evaporation device (20), operating at ambient temperature or slightly higher than the ambient temperature, comprising:
   a steel structure frame (1) for the device (20), comprising:
      a lifting platform (2) and a tray (14), wherein the tray is mounted on the lifting platform;
      an air-powered water heater device, comprising;
         an air inlet (5) and a water inlet (9) mounted on the tray (14), wherein air distribution pipe(s) (6) and water distribution pipe(s) (7) are arranged above the air inlet (5), and wherein the air distribution pipe(s) (6) distribute air from the air inlet (5) and the water distribution pipe(s) (7) are in communication with air from the air inlet (5) via a heat exchanger (22);
         an air heater, wherein the air heater produces hot air; and
         an air blower, wherein the air blower either blasts the hot air into the air inlet (5), or, the air blower blasts air, utilizing the thermal energy of the air as energy used for evaporation, without using steam or electric heating, thus providing a low cost and low energy consumption;
   a concentrated liquid waste collecting groove (4) placed above the air inlet (5),
      wherein concentrated solution outlets on side walls of the concentrated liquid waste collecting groove (4) are connected to a concentrated liquid outlet (10) for collecting concentrated liquid waste;
   a crystallization tank (30),
      wherein a plurality of mounting holes are defined in the bottom of the concentrated liquid waste collecting groove (4), and the mounting holes are provided with air distribution pipe(s) (6)
      wherein the air distribution pipe(s) (6) are connected to the air inlets (5), and the top of the air distribution pipe(s) (6) is provided with an atomizer (8),
      wherein the atomizer (8) is in communication with the water distribution pipe(s) (7) and the water inlet (9);
   a plurality of nested tube column tubes (33) in a nested tube column (3),
      wherein each nested column tube (33) is vertically installed outside the air distributing pipes (6), and each nested column tube (33) has no direct contact with each air distribution pipe(s) (6),
      wherein the nested column tubes and nested tube column extends to the top of the steel structure frame (1), wherein a gas collecting cover (12) is fixed at a top end of the steel structure frame,
      wherein the gas collecting cover (12) is in communication with the nested tube column (3), and the gas collecting cover (12) is provided with an exhaust port (13) for collecting gas;
   a demister (11) is disposed inside the cover (12); and
   a gas collection tank (31) fixed on the top of the steel structure frame (1), operably coupled to the nested column tubes and the nested tube column (3) and installed with an exhaust outlet(s).

2. The device (20) according to claim 1, further comprising a waste water collection tank (35), wherein the waste water collection tank (35) is respectively connected to the water inlet (9), the crystallization tank (30) and the concentrate outlet (10).

3. The device (20) according to claim 1, wherein the nested tube column (3) and the air inlet (5) coincide along a long axis direction.

4. The device (20) according to claim 1, wherein the atomizer is disposed on a center line of the air distribution pipe(s) (6), and is placed inside the end of the air distribution pipe(s) (6), and the atomizer (8) is in communication with the water distribution pipe(s) (7) and the water distribution pipe(s) (7) connects with the water inlet (9), and the water inlet (9) is connected to the heat exchanger (22) to communicate with the air powered water heater device.

5. The device (20) according to claim 4, wherein the nested tube column (3) heat and evaporate the wastewater using air of a certain temperature and flow rate; wherein the ambient air blower supplies air at the environmental temperature without using the air heater, or the air heater supplies heated air.

6. The device (20) according to claim 5, wherein the air has direct contact with the wastewater to exchange the heat, therefore the heat loss is less, and the heat exchange efficiency is higher.

7. A high-salt waste water air powered evaporation method, operating at ambient temperature or slightly higher than the ambient temperature, comprising the following steps:

providing the device (20) of claim 2;

S1: pretreating waste water to remove volatile organic material, and adjusting the pH value of the waste water;
S2: transporting waste water into different water tanks after treating the waste water by precipitation;

S3: pumping the waste water into the air powered low temperature evaporation device, and then vertically injecting the waste water via the atomizer, forming micro droplets, in the water distribution pipe(s) (7), at the same time the blower blasts air into the air inlet, wherein the air passes through the air distribution pipe(s) and enters in to the nested column tubes (33);

S4: blowing air from the air distribution pipe(s) through the micro droplets and forming water vapor from a vaporized part of the micro-droplets, and blowing the water vapor into the air collection tank (31), wherein a remaining part of the micro-droplets drain down into the concentrated liquid waste collecting groove (4) along the pipe(s) (7) while forming a liquid film, forming convection with the upward hot air, keep absorbing heat and continuing evaporation;

S5: the remaining waste water flowing into a concentrated liquid waste collecting groove (4), wherein after a certain amount of concentrated waste water is collected, transporting the collected concentrated water into the waste water collection tank (35) and waiting for the next treatment step, and leaving from the gas outlet after despumating by the mist eliminator;

S6:

pumping the waste water collected in the previous step into the device (20), and then vertically injecting the waste water via the atomizer, forming micro droplets in the water distribution pipe(s) (7), at the same time the blower blasts air into the air inlet, wherein the air passes through the air distribution pipe(s) and enters in to the nested column tubes (33);

S7: repeating S4 and S5;

S8:

pumping the waste water collected in the previous step into the device (20), and then vertically injecting the waste water via the atomizer, forming micro droplets in the water distribution pipe(s) (7), at the same time the blower blasts air into the air inlet, wherein the air passes through the air distribution pipe(s) and enters in to the nested column tubes (33);

S9: after repeating S4, the remaining part of micro-droplets drain down into the concentrated liquid waste collecting groove (4) along the pipe(s) (7) and after collecting a certain amount of concentrated waste water, the waste water is transported into the crystallization tank (30) through the concentrated liquid outlet (10); and S10: cooling the concentrated waste water inside the crystallization tank (30), the salt crystallized and removing crystals from the concentrate, the remaining concentrated waste water is transported to the waste water collection tank (35).

8. The method of claim 7, after adjusting by step S1, the waste water has the pH in the range of 5-9.

9. The method of claim 7, wherein when the salt content of the waste water in a waste pool is 1 weight %, the salt content of the water collection tank (35) in the step S5 is in the range of 1%-10%; the salt content of the water collection tank (35) in the step S7 is in the range of 5%-20%, and the salt content of the water collection tank (35) in the step S9 is in the range of 15%-35%.

10. The method of claim 7, wherein in the step S3, S6 and S8 the air flow is from about 0.8 meters/second to about 2.5 meters/second.

* * * * *